(12) United States Patent
Yu

(10) Patent No.: US 6,946,809 B2
(45) Date of Patent: Sep. 20, 2005

(54) MOTOR DRIVING SYSTEM

(75) Inventor: Shou-Te Yu, Taipei Hsien (TW)

(73) Assignee: Asia Vital Components Co., Ltd., Kaohsiung (TW)

( * ) Notice: Subject to any disclaimer, the term of this patent is extended or adjusted under 35 U.S.C. 154(b) by 90 days.

(21) Appl. No.: 10/673,422

(22) Filed: Sep. 30, 2003

(65) Prior Publication Data

US 2005/0067988 A1 Mar. 31, 2005

(51) Int. Cl.$^7$ .............................. H02K 9/06; H02H 7/08; G05B 5/00
(52) U.S. Cl. ...................... 318/254; 318/434; 318/472; 318/799; 388/831
(58) Field of Search ................................. 318/138, 254, 318/720–724, 439, 722, 800, 807, 810, 811, 503, 799; 388/831; 327/365, 376, 377

(56) References Cited

U.S. PATENT DOCUMENTS

| | | | | |
|---|---|---|---|---|
| 5,099,181 A | * | 3/1992 | Canon | 318/254 |
| 5,363,024 A | * | 11/1994 | Hiratsuka et al. | 318/254 |
| 5,457,766 A | * | 10/1995 | Ko | 388/831 |
| 5,727,928 A | * | 3/1998 | Brown | 361/23 |
| 5,790,430 A | * | 8/1998 | Steiert | 340/648 |
| 5,926,386 A | * | 7/1999 | Ott et al. | 700/70 |
| 5,982,122 A | * | 11/1999 | Hollenbeck et al. | 318/439 |
| 6,037,732 A | * | 3/2000 | Alfano et al. | 318/471 |
| 6,191,546 B1 | * | 2/2001 | Bausch et al. | 318/471 |
| 6,297,608 B1 | * | 10/2001 | Lin | 318/471 |
| 6,310,453 B1 | * | 10/2001 | Lin | 318/445 |
| 6,545,438 B1 | * | 4/2003 | Mays, II | 318/254 |
| 6,617,815 B1 | * | 9/2003 | Krief | 318/471 |
| 6,664,756 B2 | * | 12/2003 | Horng et al. | 318/722 |
| 6,815,916 B2 | * | 11/2004 | Horng et al. | 318/138 |

* cited by examiner

*Primary Examiner*—Marlon Fletcher
*Assistant Examiner*—Eduardo Colon Santana
(74) *Attorney, Agent, or Firm*—Bacon & Thomas PLLC

(57) ABSTRACT

A motor driving system includes a power supply unit, a voltage-stabilizing unit, a signal-generating unit, a comparing unit, and a control unit. The power supply unit provides an input supply voltage to each other unit in the system. The voltage-stabilizing unit includes a voltage-stabilizing element and produces a constant voltage. The signal-generating unit generates an input signal, which varies with high and low levels of the input supply voltage. The comparing unit compares the constant voltage with the input signal to generate a comparison signal. The control unit controls a motor's rotating speed according to the comparison signal generated by the comparing unit. When the input supply voltage is low, a lowest rotating speed is set for the control unit to control the rotating of the motor.

16 Claims, 2 Drawing Sheets

MOTOR DRIVING SYSTEM

FIELD OF THE INVENTION

The present invention relates to a motor driving system, and more particularly to a motor driving system that allows setting of a motor speed when an input supply voltage is low.

BACKGROUND OF THE INVENTION

According to the characteristics of driving elements of the currently available fan motors, when an input supply voltage thereof is high, the fan is driven to rotate at full speed to increase a cooling efficiency thereof, and when the input supply voltage thereof is low, the fan is driven to rotate at a lowest possible speed. That is, the fan speed is adjusted according to a linear change in the high and low level of the input supply voltage. In this manner, the lowest rotating speed of the fan at the low input supply voltage is a fixed value that could not be varied. Therefore, the fan has limited applications and could not always meet consumers' needs.

It is therefore tried by the inventor to develop an improved motor driving system to eliminate drawbacks existed in the conventional fan motors.

SUMMARY OF THE INVENTION

A primary object of the present invention is to provide a motor driving system that utilizes a voltage-stabilizing unit to produce a constant voltage, and a signal-generating unit to produce an input signal that varies with a level of an input supply voltage supplied from a power supply unit. A comparing unit compares the constant voltage with the input signal. When the input supply voltage is low, the input signal changes and is compared with the constant voltage by the comparing unit, so that a lowest rotating speed is set for the motor.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
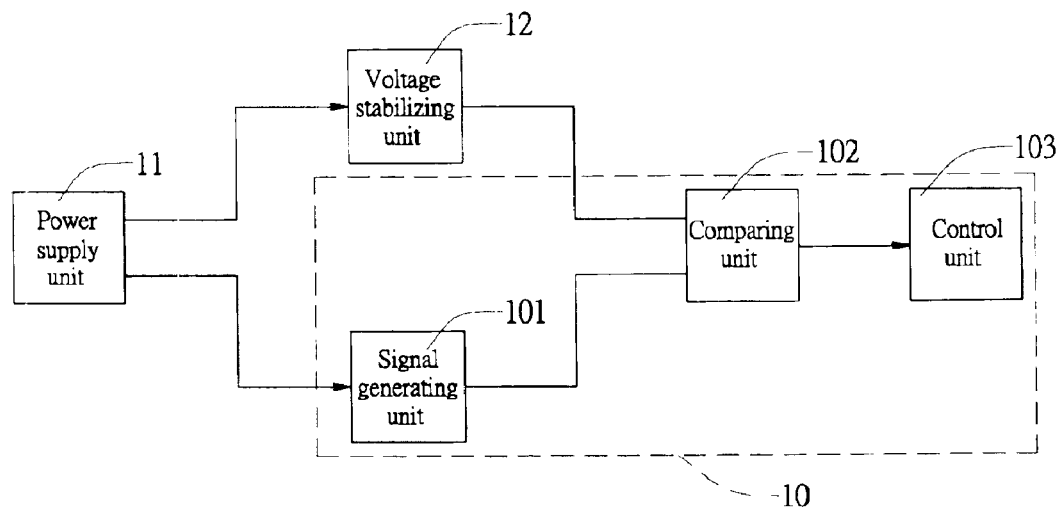
FIG. 1 is a block diagram of a motor driving system according to a first preferred embodiment of the present invention.

Please refer to FIG. 1 that is a block diagram of a motor driving system according to a first preferred embodiment of the present invention. As shown, the motor driving system of the present invention mainly includes a power supply unit 11, a voltage-stabilizing unit 12, and a driving element 10. The power supply unit 11 provides an input supply voltage to the voltage-stabilizing unit 12 and the driving element 10. The voltage-stabilizing unit 12 produces a constant voltage and provides the same to the driving element 10. The driving element 10 includes a signal-generating unit 101, a comparing unit 102, and a control unit 103. The signal-generating unit 101 is adapted to generate an input signal, which varies with high and low levels of the input supply voltage from the power supply unit 11. The comparing unit 102 is adapted to compare the constant voltage produced by the voltage-stabilizing unit 12 with the input signal generated by the signal-generating unit 101, and to generate a comparison signal. The control unit 103 is adapted to control a motor speed according to the comparison signal generated by the comparing unit 102.

Figure 2:
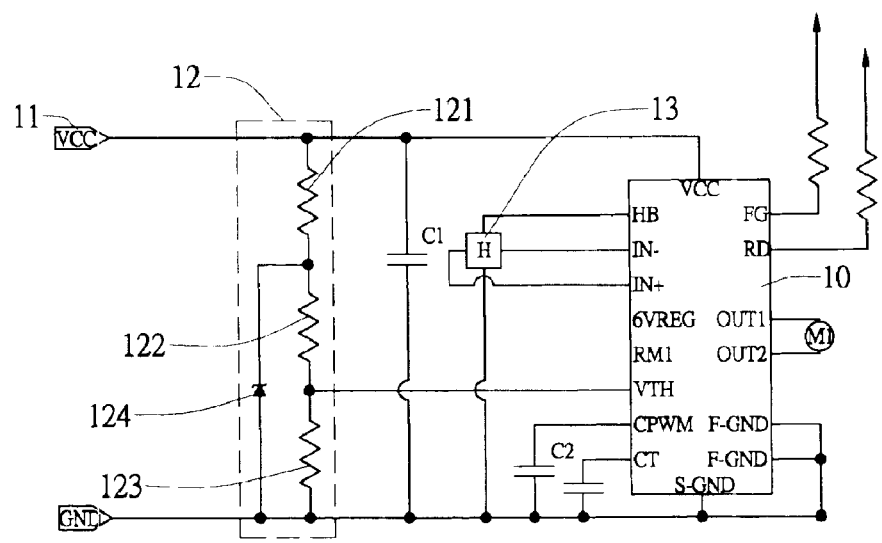
FIG. 2 is a circuit diagram of the motor driving system according to the first preferred embodiment of the present invention.

FIG. 2 is a circuit diagram of the motor driving system of FIG. 1. Please refer to FIGS. 1 and 2 at the same time. The power supply unit 11 is electrically connected via a first capacitor C1 to a power input pin Vcc of the driving element 10. The voltage-stabilizing unit 12 is a voltage-stabilizing circuit including a first resistance 121, a second resistance 122, a third resistance 123, and a voltage-stabilizing element 124, which may be a Zener diode. The voltage-stabilizing unit 12 is electrically connected to the power supply unit 11 and to a VTH pin of the driving element 10. A Hall element 13 is electrically connected to pins HB, IN−, and IN+ of the driving element 10. A Hall bias voltage is produced at the pin HB and supplied to the Hall element 13, so that the Hall element 13 is actuated to produce a Hall induced voltage for outputting to pins IN− and IN+. A second capacitor C2 is electrically connected to a pin CPWN of the driving element 10 for setting a frequency level for the input signal generated by the signal-generating unit 101. A motor M1 is electrically connected to first and second outputs OUT1, OUT2 of the driving element 10.

When an input supply voltage is supplied from the power supply unit 11 to the voltage-stabilizing unit 12, the driving element 10, and the signal-generating unit 101, the comparing unit 102, and the control unit 103 inside the driving element 10, the input supply voltage is reduced at the first resistance 121 of the voltage-stabilizing unit 12, stabilized at the voltage-stabilizing element 124, and divided at the second resistance 122 and the third resistance 123 to produce a constant voltage, which is input to the pin VTH of the driving element 10. When the input supply voltage is high, the motor M1 is rotated at full speed; and, when the input supply voltage is low, the input signal generated by the signal-generating unit 101 changes. The comparing unit 102 compares the constant voltage at the pin VTH with the changed input signal to generate a comparison signal, which is output to the control unit 103, so that a control signal is output from the first and the second output OUT1, OUT2 to control the motor M1 to rotate at the lowest speed.

The voltage-stabilizing element 124 may be otherwise a voltage stabilizer (not shown), and the signal-generating unit 101 may be otherwise a resistor-capacitor (RC) circuit or an oscillator (not shown) to provide the same function.

Figure 3:
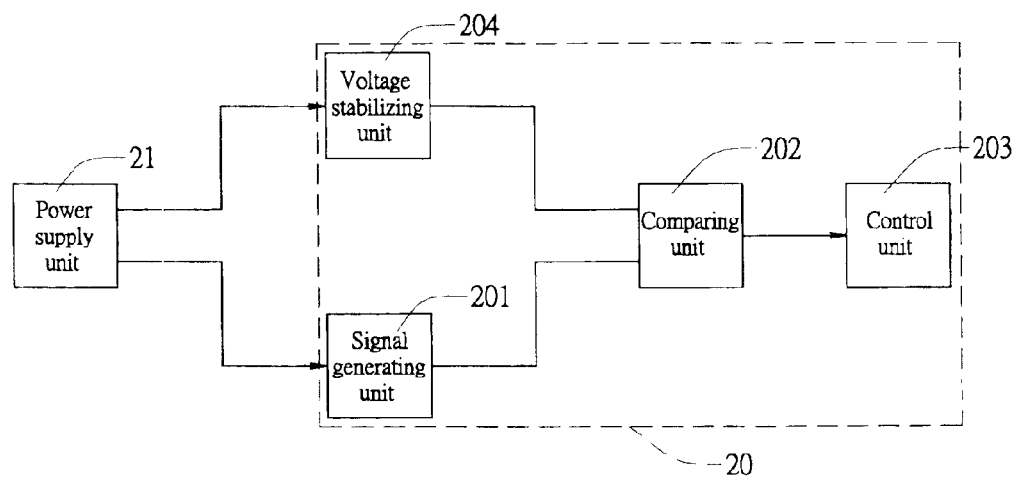
FIG. 3 is a block diagram of a motor driving system according to a second preferred embodiment of the present invention.

FIG. 3 is a block diagram of a motor driving system according to a second preferred embodiment of the present invention. As shown, the second preferred embodiment of the motor driving system of the present invention mainly includes a power supply unit 21 and a driving element 20. The power supply unit 21 provides an input supply voltage to the driving element 20. The driving element 20 includes a voltage-stabilizing unit 204, a signal-generating unit 201, a comparing unit 202, and a control unit 203. The voltage-stabilizing unit 204 includes a voltage-stabilizing element 2043 (see FIG. 4) for stabilizing a voltage. The signal-generating unit 201 is adapted to generate an input signal, which varies with high and low levels of the input supply voltage from the power supply unit 21. The comparing unit 202 is adapted to compare a constant voltage produced by the voltage-stabilizing unit 204 with the input signal generated by the signal-generating unit 201, and to generate a comparison signal. The control unit 203 is adapted to control a motor speed according to the comparison signal generated by the comparing unit 202.

Figure 4:
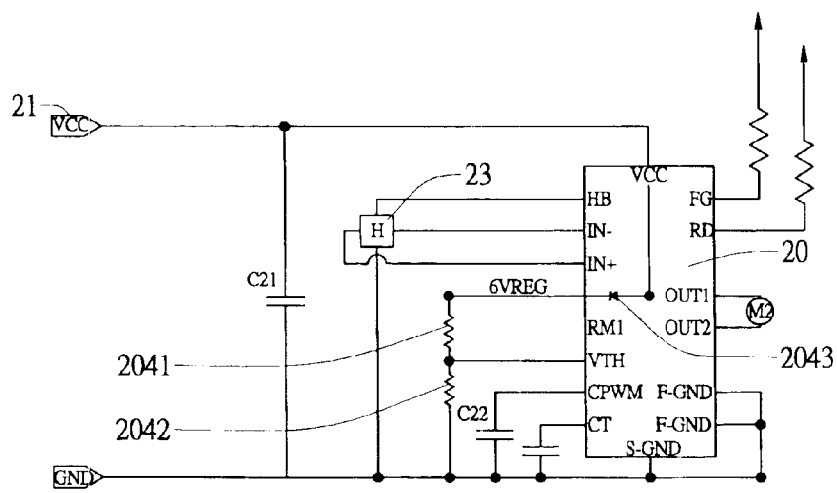
FIG. 4 is a circuit diagram of the motor driving system according to the second preferred embodiment of the present invention.

FIG. 4 is a circuit diagram of the motor driving system of FIG. 3. Please refer to FIGS. 3 and 4 at the same time. The power supply unit 21 is electrically connected via a first capacitor C21 to a power input pin Vcc of the driving element 20. The voltage-stabilizing element 2043 may be a Zener diode and is connected via a pin 6VREG to a first resistance 2041 and a second resistance 2042, and is then shunted to a pin VTH of the driving element 20. A Hall element 23 is electrically connected to pins HB, IN−, and IN+ of the driving element 20. A Hall bias voltage is produced at the pin HB and supplied to the Hall element 23, so that the Hall element 23 is actuated to produce a Hall induced voltage for outputting to pins IN− and IN+. A second capacitor C22 is electrically connected to a pin CPWN of the driving element 20 for setting a frequency level for the input signal generated by the signal-generating unit 201. A motor M2 is electrically connected to first and second outputs OUT1, OUT2 of the driving element 20.

When an input supply voltage is supplied from the power supply unit 21 to the driving element 20 and the voltage-stabilizing unit 204, the signal-generating unit 201, the comparing unit 202, and the control unit 203 inside the driving element 20, the input supply voltage is stabilized at the voltage-stabilizing element 2043 of the voltage-stabilizing unit 204 and output at the pin 6VREG, and then divided at the first resistance 2041 and the second resistance 2042 to produce a constant voltage, which is output to the pin VTH of the driving element 20. When the input supply voltage is high, the motor M2 is rotated at full speed; and, when the input supply voltage is low, the input signal generated by the signal-generating unit 201 changes. The comparing unit 202 compares the constant voltage at the pin VTH with the changed input signal to generate a comparison signal, which is output to the control unit 203, so that a control signal is output from the first and the second output OUT1, OUT2 to control the motor M2 to rotate at the lowest speed.

The voltage-stabilizing element 2043 may be otherwise a voltage stabilizer (not shown), and the signal-generating unit 201 may be otherwise a resistor-capacitor (RC) circuit or an oscillator (not shown) to provide the same function.

With the motor driving system of the present invention, the motor M1, M2 may be set to the lowest rotating speed when the input supply voltage is low. Therefore, the present invention allows the motor to have widened applications.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A motor driving system comprising a power supply unit, a voltage-stabilizing unit, and a driving element;

said power supply unit providing an input supply voltage to said voltage-stabilizing unit and said driving element;

said voltage-stabilizing unit including a voltage-stabilizing element and producing a constant voltage which is provided to said driving element; and said driving element including a signal-generating unit, a comparing unit, and a control unit; said signal-generating unit being adapted to generate an input signal, which varies with high and low levels of the input supply voltage from said power supply unit; said comparing unit being adapted to compare the constant voltage produced by said voltage-stabilizing unit with the input signal generated by said signal-generating unit, and to generate a comparison signal; and said control unit being adapted to control a motor's rotating speed according to the comparison signal generated by said comparing unit;

whereby when the input supply voltage supplied from said power supply unit is low and the input signal generated by said signal-generating unit changes, said comparing unit compares the constant voltage provided by said voltage-stabilizing unit and the changed input signal to generate said comparison signal, according to which a lowest motor speed is set for said control unit to control the rotating of the motor.

2. The motor driving system as claimed in claim 1, wherein said voltage-stabilizing unit is a voltage-stabilizing circuit.

3. The motor driving system as claimed in claim 1, wherein said voltage-stabilizing unit is a Zener diode.

4. The motor driving system as claimed in claim 1, wherein said voltage-stabilizing unit is a voltage stabilizer.

5. The motor driving system as claimed in claim 1, wherein said signal-generating unit is a resistor-capacitor (RC) circuit.

6. The motor driving system as claimed in claim 1, wherein said signal-generating unit is an oscillator.

7. The motor driving system as claimed in claim 1, wherein said signal-generating unit includes a capacitor for setting a frequency level of the input signal.

8. The motor driving system as claimed in claim 1, further comprising a Hall element.

9. A motor driving system, comprising a power supply unit and a driving element;

said power supply unit providing an input supply voltage to said driving element; and said driving element including a voltage-stabilizing unit, a signal-generating unit, a comparing unit, and a control unit; said voltage-stabilizing unit being adapted to produce a constant voltage; said signal-generating unit being adapted to generate an input signal, which varies with high and low levels of the input supply voltage from said power supply unit; said comparing unit being adapted to compare the constant voltage produced by said voltage-stabilizing unit with the input signal generated by said signal-generating unit, and to generate a comparison signal; and said control unit being adapted to control a motor's rotating speed according to the comparison signal generated by said comparing unit;

whereby when the input supply voltage supplied from said power supply unit is low and the input signal generated by said signal-generating unit changes, said comparing unit compares the constant voltage provided by said voltage-stabilizing unit and the changed input signal to generate said comparison signal, according to which a lowest motor speed is set for said control unit to control the rotating of the motor.

10. The motor driving system as claimed in claim 9, wherein said voltage-stabilizing unit includes a voltage-stabilizing element.

11. The motor driving system as claimed in claim 10, wherein said voltage-stabilizing element is a Zener diode.

12. The motor driving system as claimed in claim 10, wherein said voltage-stabilizing element is a voltage stabilizer.

13. The motor driving system as claimed in claim 9, wherein said signal-generating unit is a resistor-capacitor (RC) circuit.

14. The motor driving system as claimed in claim 9, wherein said signal-generating unit is an oscillator.

15. The motor driving system as claimed in claim 9, wherein said signal-generating unit includes a capacitor for setting a frequency level of the input signal.

16. The motor driving system as claimed in claim 9, further comprising a Hall element.

* * * * *